F. A. TRIBBE.
TROLLEY HARP.
APPLICATION FILED SEPT. 23, 1908.
921,314.
Patented May 11, 1909.
2 SHEETS—SHEET 2.
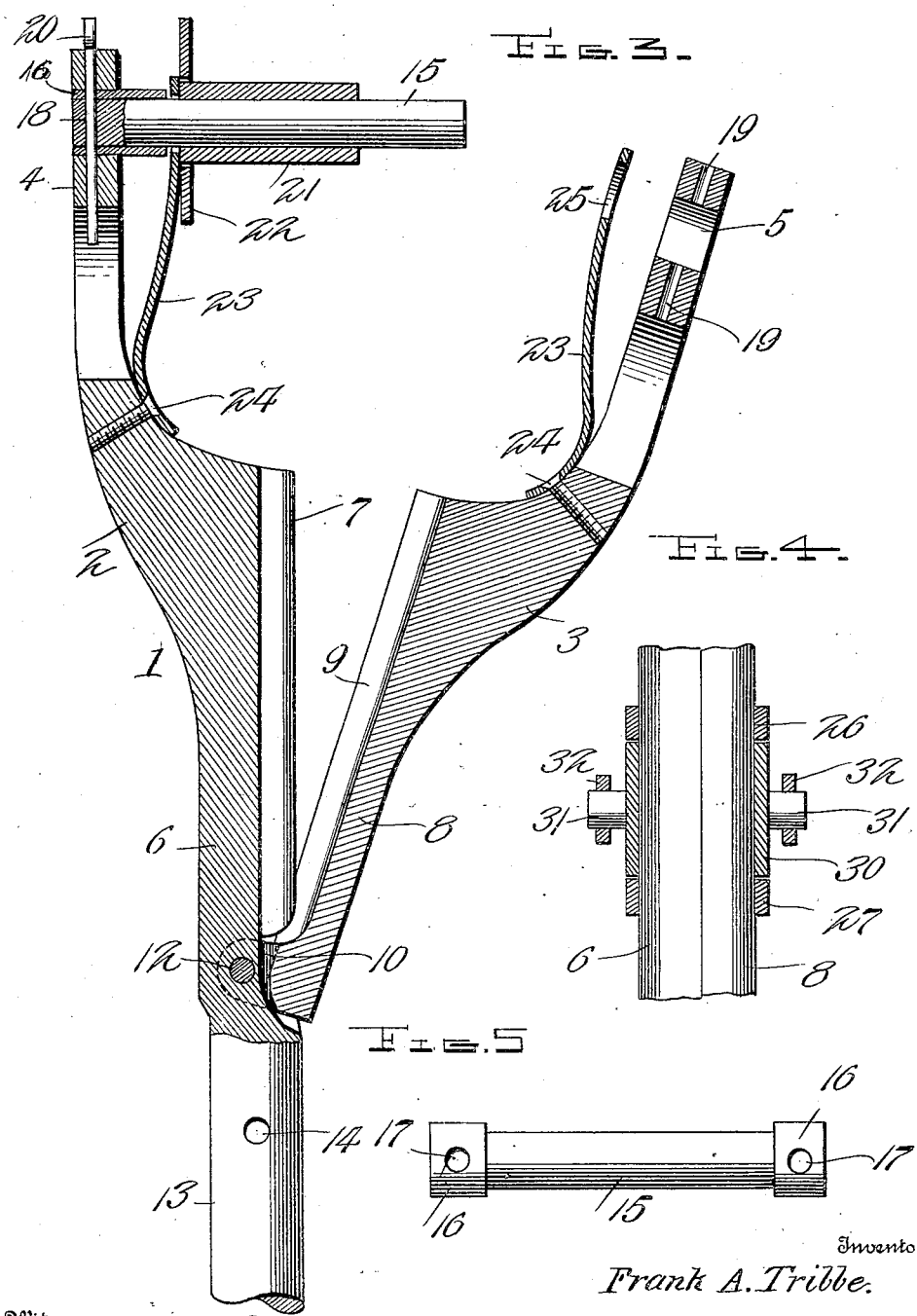
Inventor
Frank A. Tribbe.
Witnesses
By Victor J. Evans
Attorney

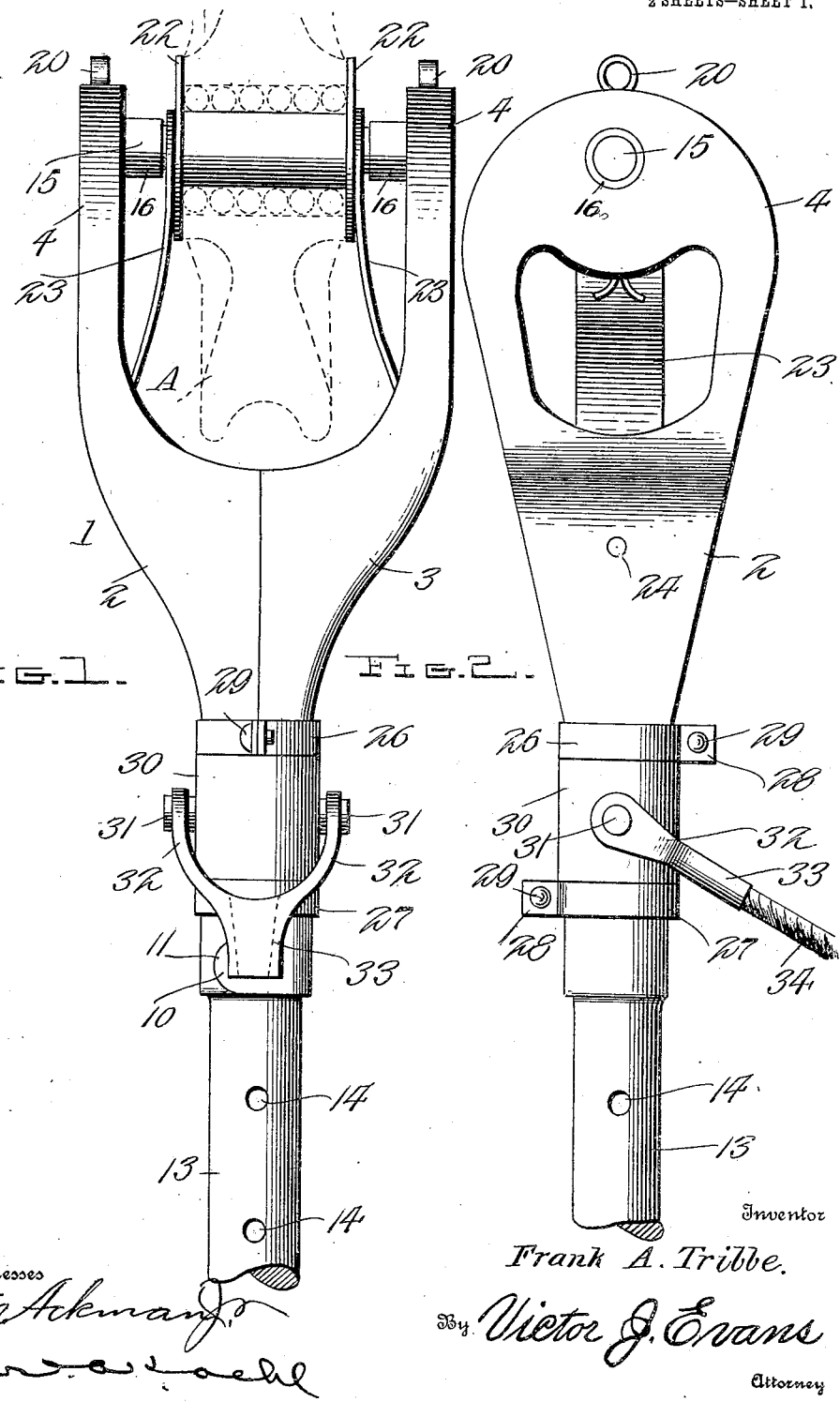

UNITED STATES PATENT OFFICE.

FRANK A. TRIBBE, OF IRONTON, MISSOURI.

TROLLEY-HARP.

No. 921,314.       Specification of Letters Patent.       Patented May 11, 1909.

Application filed September 23, 1908. Serial No. 454,354.

*To all whom it may concern:*

Be it known that I, FRANK A. TRIBBE, a citizen of the United States, residing at Ironton, in the county of Iron and State of Missouri, have invented new and useful Improvements in Trolley-Harps, of which the following is a specification.

This invention relates to trolley harps and has for an object to provide a harp with means to permit the ready attachment of a trolley wheel to the axle of the harp and to permit the ready removal of the same when it is desired to substitute a new wheel for a worn one or a new axle for an old axle.

A further object of this invention is to provide novel means for securing the axle to members of the harp, and to construct the harp in a manner so that one of its members may be moved toward or away from the axle.

A further object is to provide a rotatable cord retaining means adapted to be conveniently engaged with portions of the harp.

Other objects and advantages will be apparent as the nature of the invention is better disclosed, and it will be understood that changes within the scope of the invention may be made without departing from the spirit of the invention.

In the drawings, forming a portion of this specification, and in which like numerals of reference indicate similar parts in the several views, Figure 1 is a front view of the trolley harp, Fig. 2 is a side view, Fig. 3 is a vertical longitudinal section showing the harp in an open position, Fig. 4 is a sectional view through revoluble rope retainer, Fig. 5 is a plan view of the axle.

Referring now more particularly to the drawings there is shown a trolley harp 1 consisting of members 2 and 3 having vertically disposed heads 4 arranged in parallel spaced relation to each other, and as shown, each head is provided with an aperture 5 for a purpose to be hereinafter described. The member 2 is provided with a shank 6 having a vertical bead or rib 7 formed upon its inner face. The member 3 is provided with a shank 8 having a vertical groove 9 adapted to receive the bead or rib 7 when the members are in a closed position as is obvious. The shank 8 is provided at the lower end thereof with ears 10 seated in recesses 11 formed in the shank 6, and these ears receive a transversely disposed pivot pin 12 so that the member 3 can be moved toward or away from the member 2 for a purpose to be hereinafter described. The shank 6 carries or has formed integral therewith a depending stem 13 in which is formed passages 14 to receive suitable fastening devices carried by a trolley pole, not shown.

An axle 15 is provided, and is preferably of solid construction and has fitted to its ends bushings or collars 16 to be seated in the apertures 5 formed in the heads 4, and as shown, these bushings or collars, are provided with passages 17 adapted to aline with passages 18 formed in the axle adjacent to its ends, and these passages 16 and 17 are adapted to be brought into alinement with passages 19 formed in the heads, and which open into the apertures 5 as will be clearly seen upon reference to Fig. 3 of the drawings. The passages formed in the axle and the collars carried thereby and the passages 19 formed in the heads 4 receive removable cotter pins or the like 20 for holding the axle in an operative position but providing means to effect ready detachment of the axle as is apparent.

In practice when it is desired to mount a wheel upon the axle, the member 3 is swung from the member 2 after the pin carried by the head 4 of the member 3 has been removed, and in this position of the member it is obvious that free access is had to the axle so that the sleeve 21 may be mounted upon the axle for supporting the ball bearing trolley wheel shown in dotted lines A in Fig. 1 of the drawings. At each end of the sleeve 21, I provide a circular collar 22 against which is adapted to bear the upper end of a contact spring 23. The springs 23 are secured by means of fastening devices 24 to the members 2 and 3 of the harp as clearly shown in Fig. 3, and the upper ends of the said springs are preferably provided with openings 25 to receive portions of the axle 15.

Spaced clamping members 26 and 27 are mounted upon the shanks 6 and 8 of the harp and are preferably formed of split bands having right angularly disposed terminal ends 28 which receive clamping screws 29. The members 26 and 27 are disposed in spaced relation to each other, and confined between said members is a revoluble element 30 having radially disposed trunnions 31 with which are engaged arms 32 of a rope retainer having a socket 33 for receiving one end of the usual form of trolley rope indicated at 34 in Fig. 2 of the drawings. It will of course, be understood that the element 30 and the members 26 and 27 respectively are removed from the shanks of the harp when it is desired to swing the member 3 away from the member 2 to gain access to the axle for the purpose set forth.

From the construction described it will be understood that a simple and inexpensive trolley harp is provided which includes means to permit ready access to the axle when it is desired to remove or place upon the axle, the trolley wheel. The provision of the springs serves to effect close contact of the collars 22, and may be conveniently attached to or removed from the heads of the harp. It will be seen that the springs 23 not only serve as means to engage the sleeve 21 at its ends, but these springs are so constructed that they also serve to hold the collars 22 in their proper position.

Having thus described the invention, what is claimed as new, is;—

1. A trolley harp comprising hingedly connected members, each member having a shank and a vertically disposed head, an axle detachably engaged at its ends with the heads, a sleeve mounted upon the axle, collars mounted upon the sleeve at the ends thereof, springs yieldingly engaged with the sleeve at the ends thereof and engaged with the collars for holding them against displacement, a revoluble element mounted upon the shanks of said members adapted to hold the members against pivotal movement, and clamping sleeves engaged with the shanks and disposed above and below the said revoluble element.

2. A trolley harp comprising hingedly connected members embodying shanks provided with spaced heads, an axle removably engaged at its ends with the heads, a sleeve mounted upon the axle provided at its ends with collars, spring means for yieldingly engaging the ends of the sleeve, bushings surrounding the axle at its ends having their ends disposed in spaced relation with respect to the ends of the sleeve, said springs having their upper ends disposed between the bushings and the ends of the sleeve, and means engaged with the shanks of said members for holding them against pivotal movement.

In testimony whereof I affix my signature in presence of two witnesses.

FRANK A. TRIBBE.

Witnesses:
C. E. CALVERT,
M. S. CALVERT.